Figure 6:
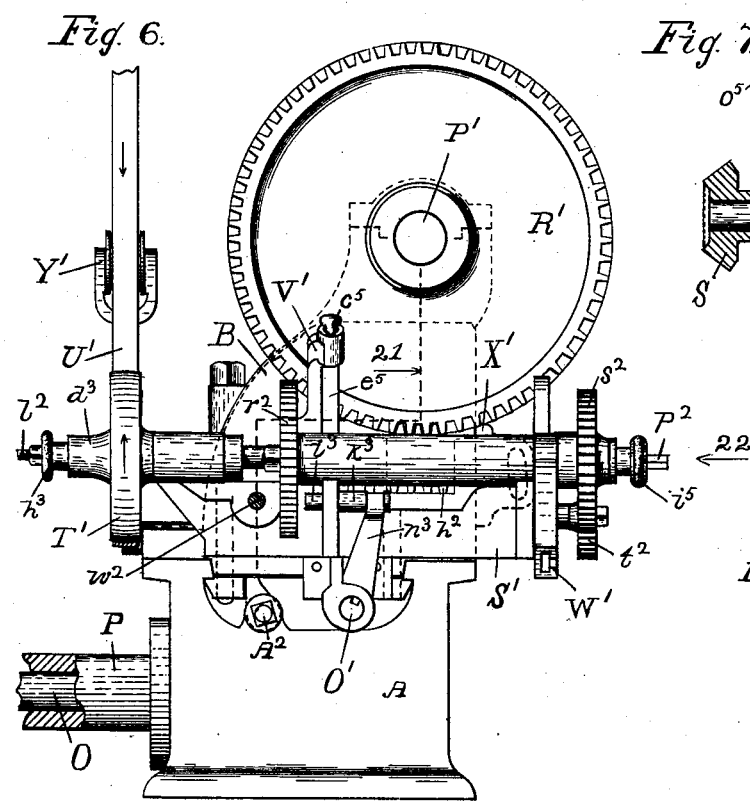

No. 678,337. Patented July 9, 1901.
W. & J. E. GLEASON.
GEAR PLANER.
(Application filed Dec. 31, 1900.)
(No Model.) 7 Sheets—Sheet 1.
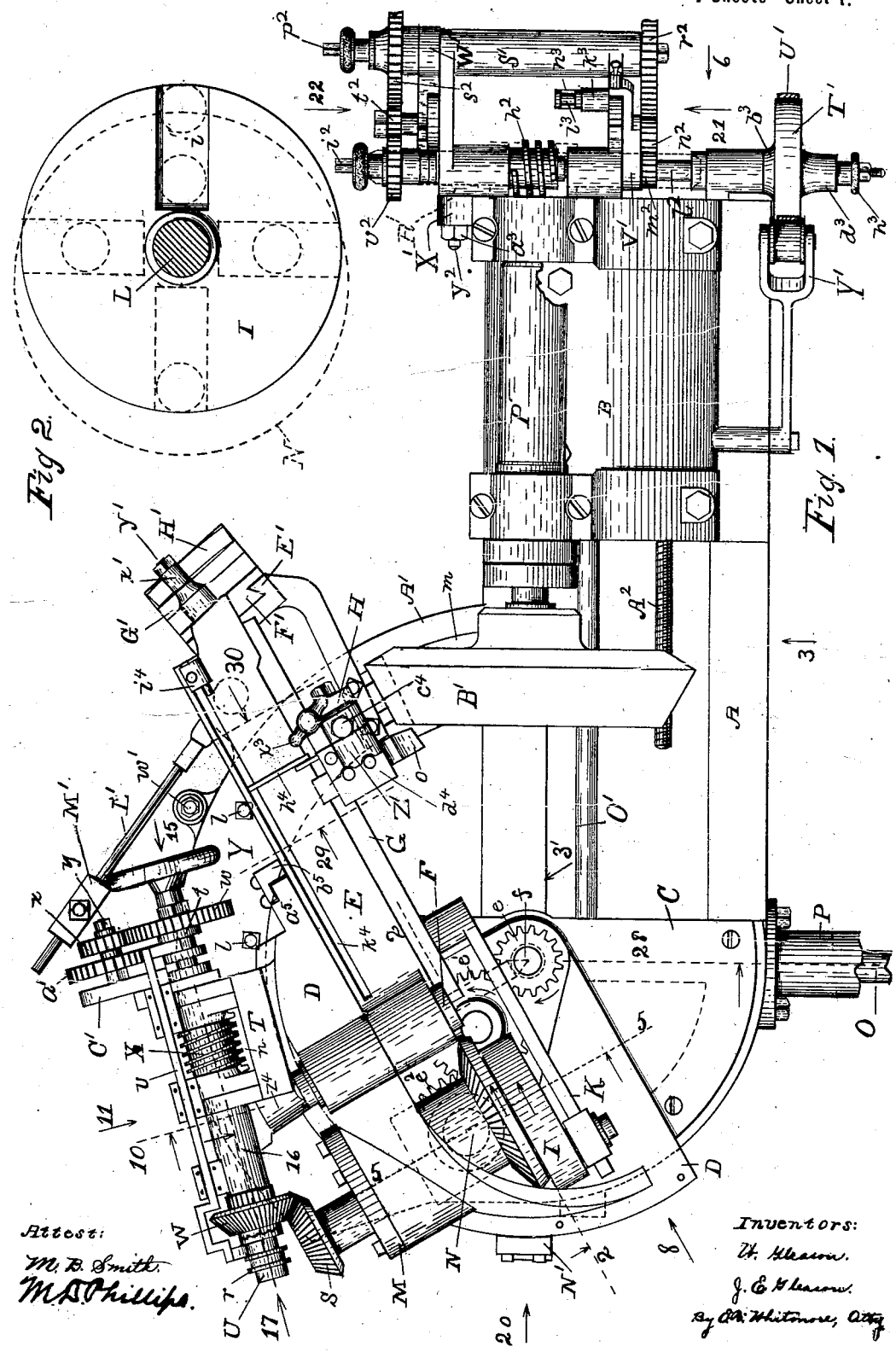
Attest:
M. B. Smith.
M. S. Phillips.
Inventors:
W. Gleason.
J. E. Gleason.
By Chr. Whitmore, Atty No. 678,337. Patented July 9, 1901.
W. & J. E. GLEASON.
GEAR PLANER.
(Application filed Dec. 31, 1900.)
(No Model.) 7 Sheets—Sheet 2.
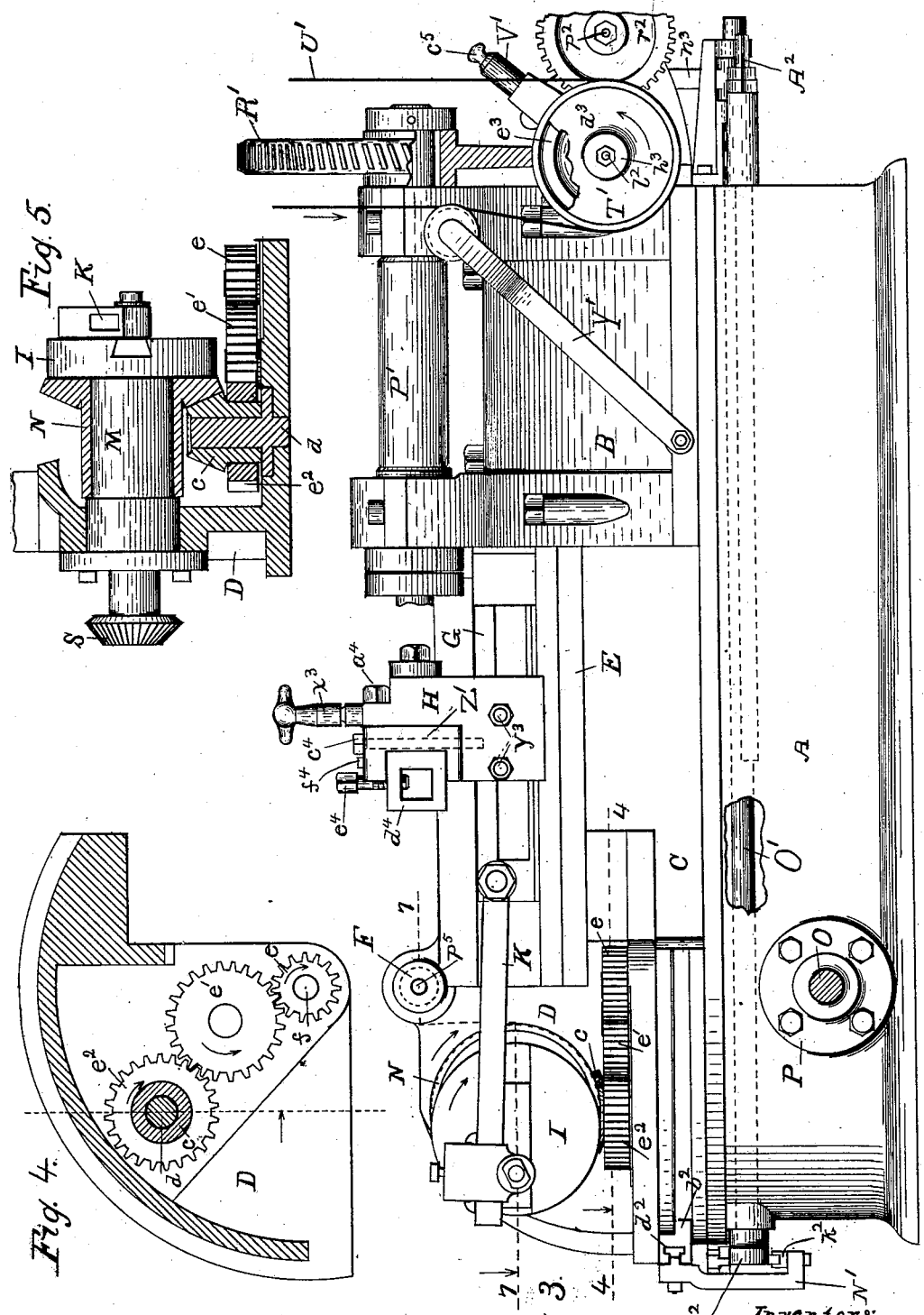

No. 678,337. Patented July 9, 1901.
W. & J. E. GLEASON.
GEAR PLANER.
(Application filed Dec. 31, 1900.)
(No Model.) 7 Sheets—Sheet 3.

Attest:
M. B. Smith.
M. S. Phillips.

Inventors:
W. Gleason.
J. E. Gleason.
By E. R. Whitmore, Atty.

No. 678,337.  
W. & J. E. GLEASON.  
GEAR PLANER.  
(Application filed Dec. 31, 1900.)  
Patented July 9, 1901.
(No Model.)  
7 Sheets—Sheet 4.
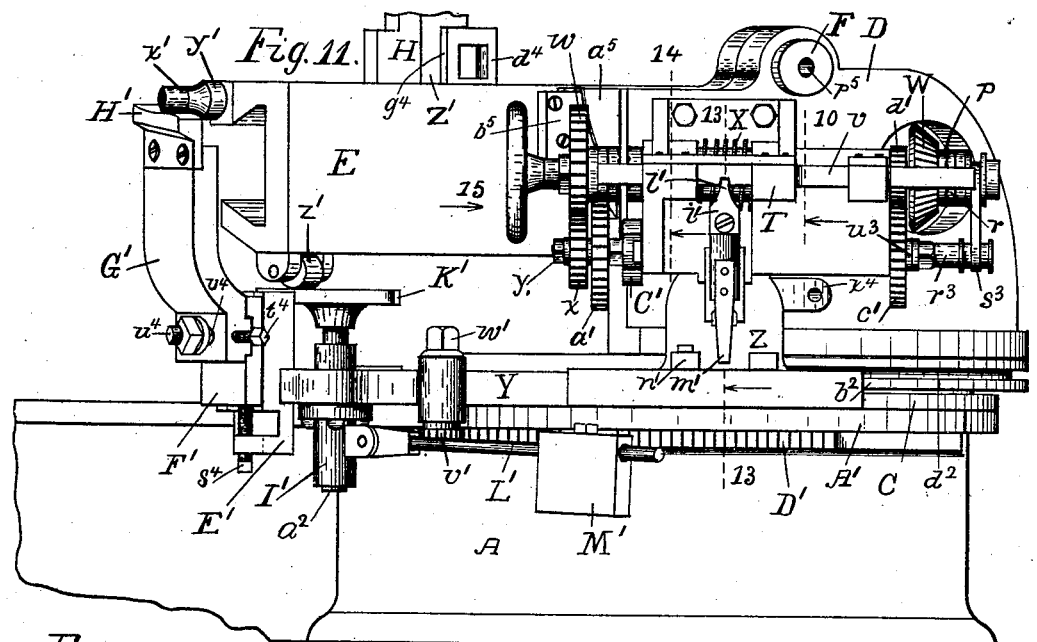
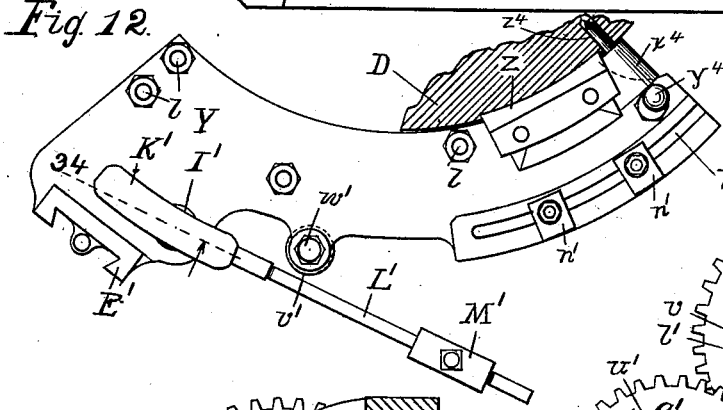
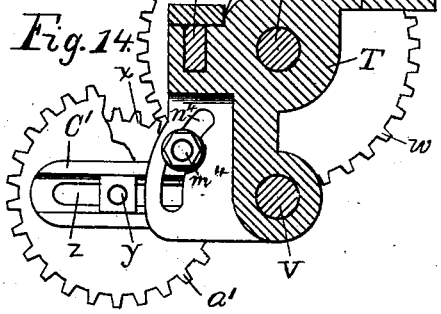
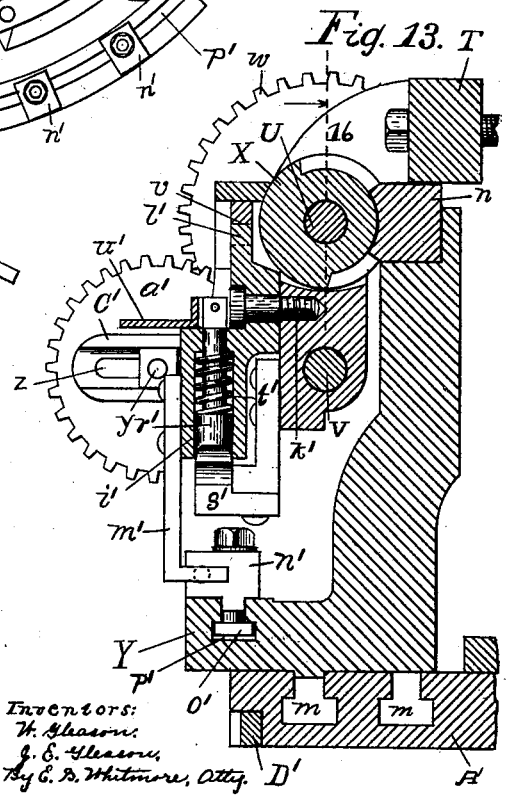
Attest:  
M. B. Smith.  
M. D. Phillips.
Inventors:  
W. Gleason,  
J. E. Gleason,  
By E. D. Whitmore, Atty.

No. 678,337. Patented July 9, 1901.
W. & J. E. GLEASON.
GEAR PLANER.
(Application filed Dec. 31, 1900.)
(No Model.) 7 Sheets—Sheet 5.
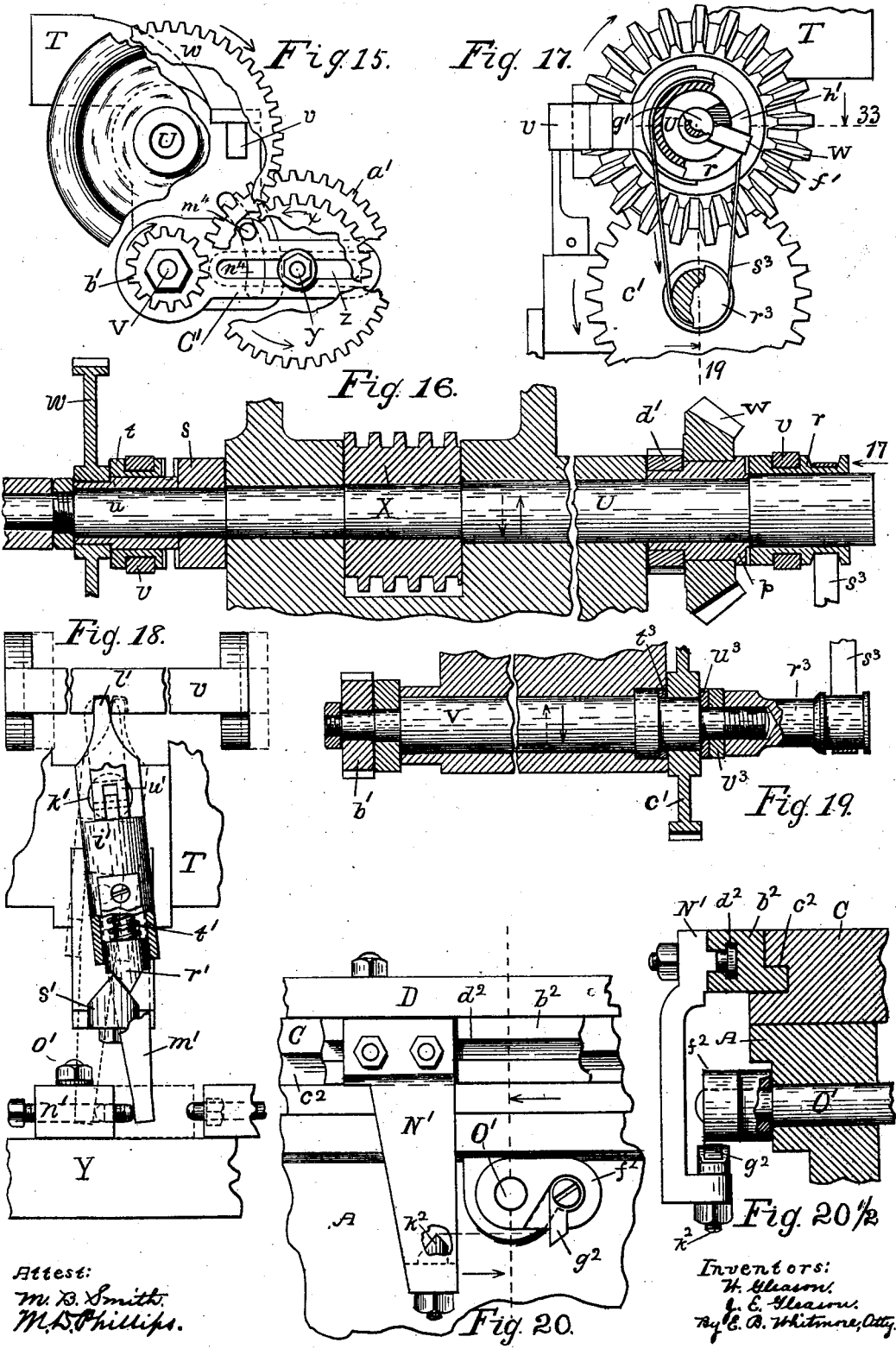

No. 678,337. Patented July 9, 1901.
W. & J. E. GLEASON.
GEAR PLANER.
(Application filed Dec. 31, 1900.)
(No Model.) 7 Sheets—Sheet 6.
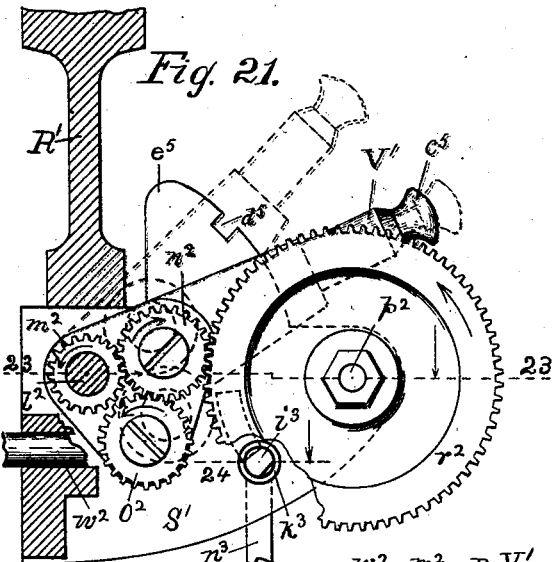
Fig. 21.
Fig. 22.
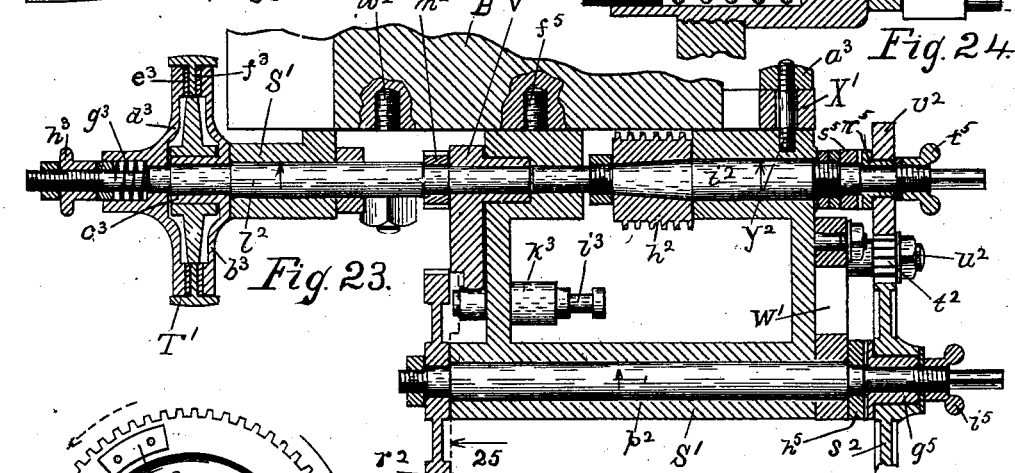
Fig. 23.
Fig. 24.
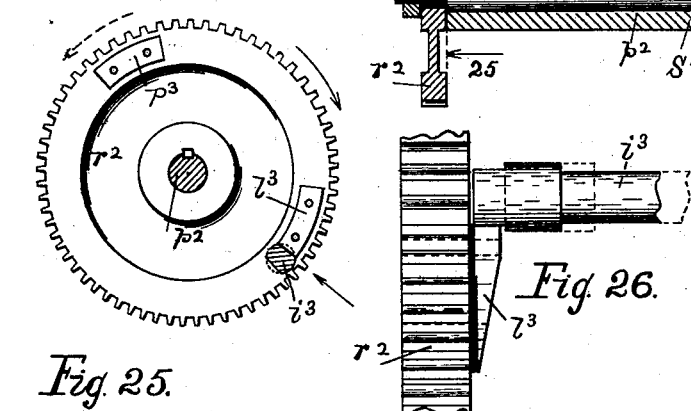
Fig. 25.
Fig. 26.
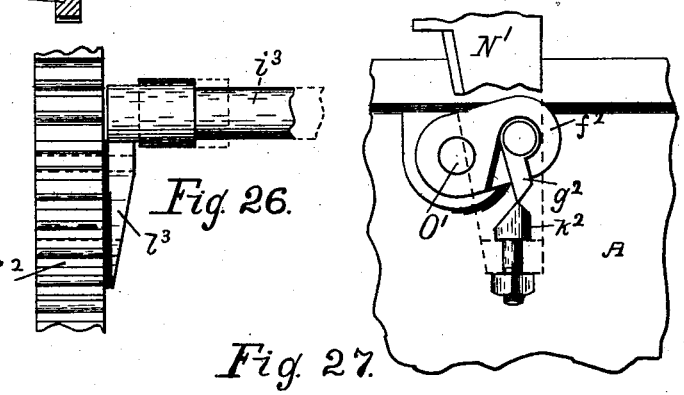
Fig. 27.
Attest:
M. B. Smith.
M. A. Phillips.
Inventors:
W. Gleason.
J. E. Gleason,
By E. B. Whitmore, Atty.

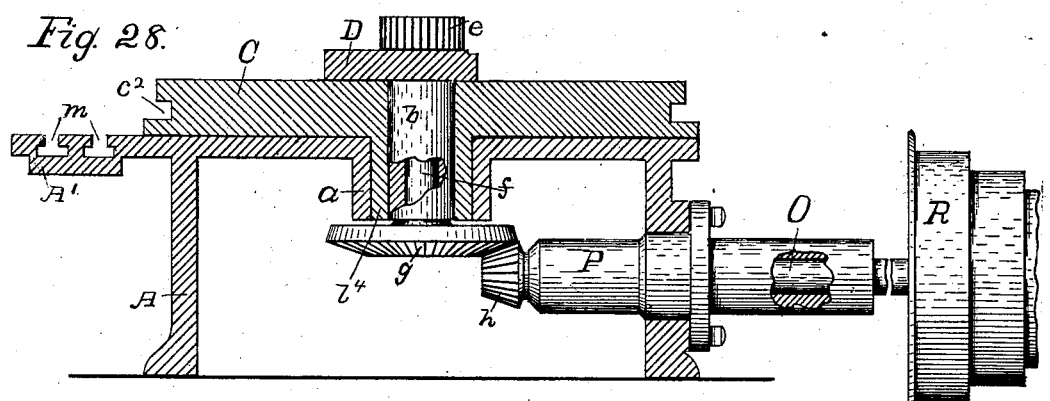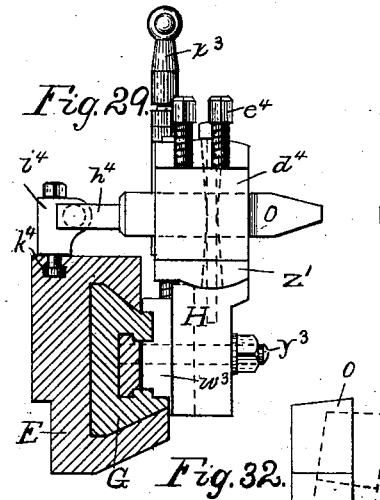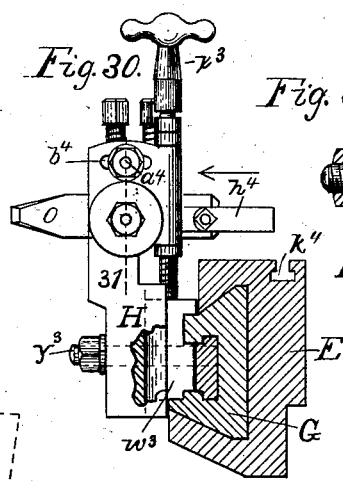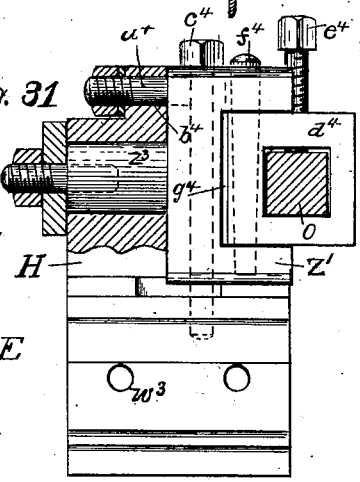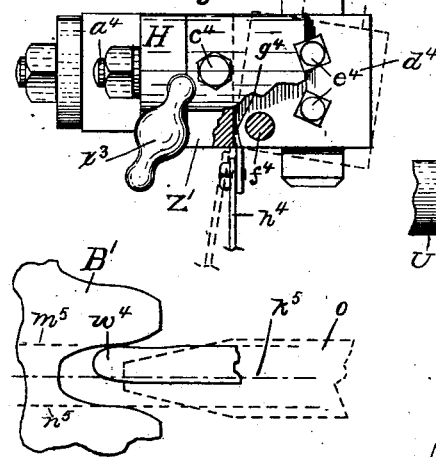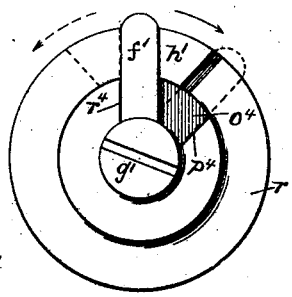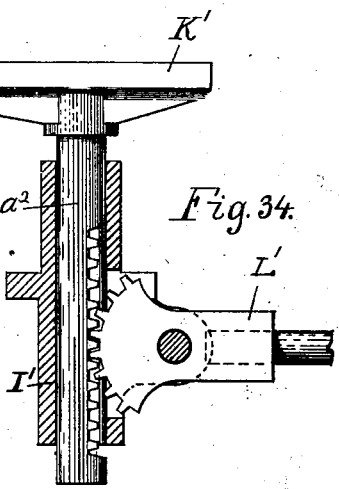

UNITED STATES PATENT OFFICE.

WILLIAM GLEASON AND JAMES E. GLEASON, OF ROCHESTER, NEW YORK, ASSIGNORS TO GLEASON TOOL COMPANY, OF SAME PLACE.

GEAR-PLANER.

SPECIFICATION forming part of Letters Patent No. 678,337, dated July 9, 1901.

Application filed December 31, 1900. Serial No. 41,667. (No model.)

*To all whom it may concern:*

Be it known that we, WILLIAM GLEASON and JAMES E. GLEASON, of Rochester, in the county of Monroe and State of New York, have invented a new and useful Improvement in Gear-Planers, which improvement is fully set forth in the following specification and shown in the accompanying drawings.

Our invention is an improved machine for forming the teeth of gears by the process of planing, the same consisting of parts and devices and the operations of the same, all hereinafter fully described, and more particularly pointed out in the claims.

In using gear-planers some difficulty has heretofore been experienced in the essential matters of feeding and of indexing, and to remedy these and other defects our present invention has been produced.

To effect these improvements one of the main objects of the invention is to provide a better and more accurate mechanism for feeding and for withdrawing or swinging back the cutting-tool preparatory to indexing the blank gear to be toothed.

Another object of the invention is to provide for the planer a better indexing mechanism and one that shall be more exact and certain in its action and more conveniently managed, whereby the blank gear may be accurately and precisely turned or shifted to the various positions necessary for receiving accurately-formed and exactly-spaced teeth.

Other objects of the invention and improvements in the machine will be brought out and made to appear in the specification following, reference being had to the accompanying drawings, in which—

Figure 7:
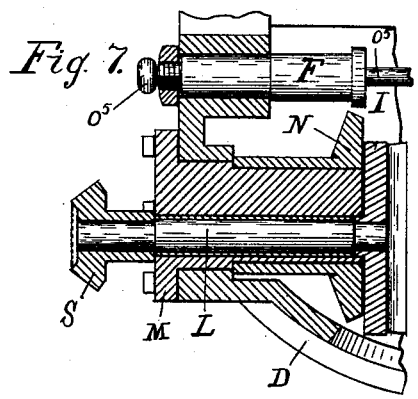
Figure 9:
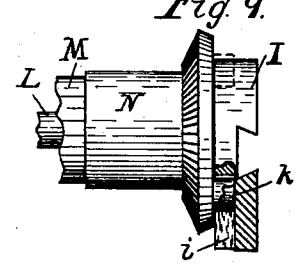
Figure 8:
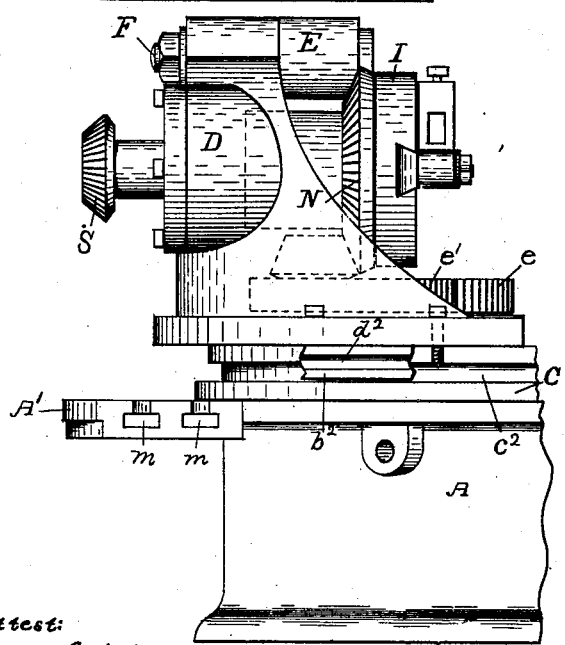
Figure 10:
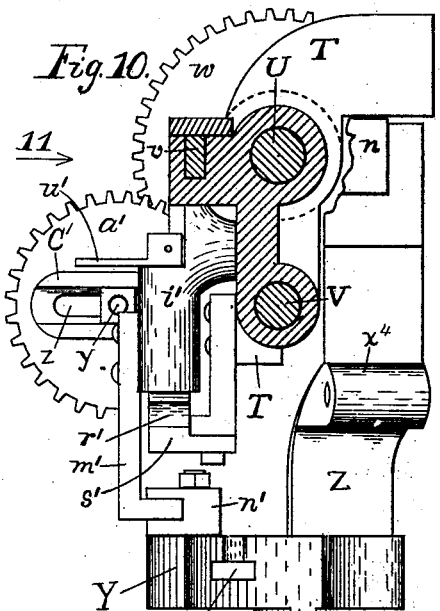

Figure 1 is a plan of the device with parts broken away and omitted. Fig. 2 is a cross-section of the quick-return crank-shaft, taken on the dotted line 2 2 in Fig. 1, the crank-head being shown in various positions by full and dotted lines. Fig. 3 is a side elevation of the planer seen as indicated by arrow 3 in Fig. 1, parts being broken away and other parts being omitted, the turret with dependent parts being viewed as indicated by arrow 3 in said Fig. 1. Fig. 4 is a plan of the lower part of the turret, horizontally sectioned on the dotted line 4 4 in Fig. 3, showing some of the driving-gears for the crank-shaft. Fig. 5 is a vertical section of the turret and some associated parts on the dotted line 5 5 in Fig. 1, further showing the relation of the parts. Fig. 6 is a rear end elevation of the planer seen as indicated by arrow 6 in Fig. 1. Fig. 7 is a horizontal section of a part of the turret and accompanying parts on the broken dotted line 7 7 in Fig. 3, further showing the crank-shaft and associated parts. Fig. 8 is an elevation of the turret and other parts seen as indicated by arrow 8 in Fig. 1, parts being broken away and other parts omitted. Fig. 9 shows the sleeve-gear and crank-head detached, parts being vertically sectioned and broken away. Fig. 10 is an elevation of the feed-works bracket vertically sectioned on the dotted line 10 in Figs. 1 and 11, parts being broken away and omitted. Fig. 11 is an elevation of parts at the rear of the planer seen as indicated by arrow 11 in Figs. 1 and 10, parts being broken away and omitted. Fig. 12 is a plan of the base-quadrant and associated parts detached. Fig. 13 is a vertical section of the base-quadrant and feed-works bracket on the dotted line 13 13 in Fig. 11. Fig. 14 is a vertical section of the feed-works bracket on the dotted line 14 in Fig. 11. Fig. 15 is an end view of the feed-works bracket and associated parts seen as indicated by arrow 15 in Figs. 1 and 11, parts being broken away. Fig. 16 is a vertical section of a part of the feed-works bracket and dependent parts on the axis of the feed-shaft, indicated by dotted line 16 in Figs. 1 and 13, parts being broken away. Fig. 17 is an end view of parts of the feed-works seen as indicated by arrow 17 in Figs. 1 and 16, with parts broken away. Fig. 18 is a rear elevation of parts of the feed-works seen as indicated by arrow 11 in Figs. 1 and 10, parts being shown in two positions by full and dotted lines, with parts broken away. Fig. 19 is a vertical section of parts of the feed-works bracket and associated parts on the dotted line 19 in Fig. 17, with parts broken out. Fig. 20 is an elevation of parts at the front end of the machine seen as indicated by arrow 20 in Fig. 1, parts being broken away. Fig. 20½ is a section of a part of the frame and other parts on the vertical dotted line in Fig. 20, parts being broken away. Fig. 21 is an end elevation of parts of the index mechanism seen as indicated by arrow 21 in Figs. 1 and 6, parts being broken away and other parts vertically sectioned on the broken dotted line at the point of said arrow in Fig. 6. Fig. 22 is an end view of parts of the index mechanism seen as indicated by arrow 22 in Figs. 1 and 6, with parts broken away and vertically sectioned. Fig. 23 is a horizontal section of the index-bracket and associated parts on the broken dotted line 23 23 in Fig. 21. Fig. 24 is a horizontal section of a part of the index-bracket and associated parts on the axis of the stop-bolt, indicated by the dotted line 24 in Fig. 21. Fig. 25 is a view of the stop-gear seen as indicated by arrow 25 in Fig. 23, the shaft and stop-bolt being transversely sectioned on the broken dotted line at the point of the arrow. Fig. 26 is a view of a part of the stop-gear and coacting part of the stop-bolt seen as indicated by arrow in Fig. 25, showing the engagement of the parts, the bolt being shown in two positions by full and dotted lines. Fig. 27 is a view at the end of the frame, indicated by arrow 20 in Fig. 1, showing the trip mechanism in action, parts being broken away. Fig. 28 is a vertical section of the frame and some associated parts on the dotted line 28 in Fig. 1, showing the primary driving mechanism, parts broken away. Fig. 29 is an elevation of the tool-post seen as indicated by arrow 29 in Fig. 1, the section being on the dotted line at the point of the arrow. Fig. 30 is an elevation of the tool-post, as indicated by arrow 30 in Fig. 1, the section being on the dotted line at the point of the arrow. Fig. 31 is a rear elevation of the tool-post and vertical slide-block, indicated by arrow in Fig. 30, parts being vertically sectioned on the dotted line 31 in said Fig. 30. Fig. 32 is a plan of the tool-post, a part of the swivel-box being broken away and parts shown in two positions by full and dotted lines. Fig. 33 is a view of a clutch of the feed mechanism and some associated parts, parts being diametrically sectioned, as on the dotted line 33 in Fig. 17. Fig. 34 is a side elevation of parts of the counterweight lever and shoe with holder, the latter being diametrically sectioned, as on the dotted line 34 in Fig. 12. Fig. 35 is a view of parts of the teeth of a gear and cutting-tools, showing the relative positions of the same. Fig. 36 is an end view of the feed-shaft, further showing the engaging finger and the associated clutch member, the parts being shown in various positions by full and dotted lines. Figs. 1 and 3 to 9, inclusive, and Figs. 11, 12, and 28 are drawn about one-eighth size; Figs. 29 and 30, one-sixth size; Figs. 2, 10, 13, 14, 15, 20, 22, 25, 27, and 34, one-fourth size; Figs. 16 to 19 and 33, one-third size; Figs. 24, 26, 31, and 32, one-half size; and Figs. 23 and 36, three-sixteenths and two-thirds size, respectively.

Referring to the drawings, A, Figs. 1, 3, and 11, is the frame of the machine, and B the head-block or head, longitudinally adjustable upon the frame.

C is the turret-base, secured horizontally upon a circular widened part of the frame, formed with a hub $l^4$, Fig. 28, occupying the interior of a vertical central hub $a$ of the frame.

D is the turret upon the base C, formed with a sleeve $b$, adapted to turn horizontally in the turret-base, the latter and the turret being coaxial.

E, Figs. 1, 3, 7, and 11, is an overhanging tool-carrying arm held to swing vertically upon a horizontal stud F, rigid in the turret.

G, Figs. 1, 3, 29, and 30, is a slide adapted to have longitudinal motions in the arm E.

H, Figs. 1, 3, and 29 to 32, is a tool-post carried by and adapted to be adjusted longitudinally along the slide G.

I is a crank connected with the slide G by a rod K, by means of which the slide is reciprocated when the crank is turned.

L, Figs. 7 and 9, is the crank-shaft, held eccentrically in a sleeve M, Figs. 1 and 5, rigid with the turret.

N is a bevel sleeve-gear adapted to turn on the sleeve M, actuated by a vertical pinion $c$, held to turn on a stud $d$, rigid in the base of the turret. This sleeve-gear is provided with a crank pin or stud $k$, Fig. 9, in position to occupy and traverse a radial chamber or depression $i$, Fig. 2, in the crank when the gear is turned and so rotate the crank. The rotations of the crank give to the tool-post and tool a quick and a slow motion alternately on account of the eccentricity of the crank with the sleeve-gear, said quick and slow motions occurring respectively during successive half-revolutions of the crank.

$e$ $e'$ $e^2$, Figs. 3, 4, and 5, are a train of horizontal spur driving-gears for the pinion $c$, the gear $e^2$ being rigid with the hub of said pinion $c$. The spur-pinion $e$ is rigid with a vertical shaft $f$, Fig. 28, held to turn in the sleeve $b$ of the turret, the shaft being provided at its lower end with a bevel-gear $g$. A driving-shaft O, held in a horizontal sleeve P, rigid with the frame, is provided at its outer end with a step-pulley R and at its inner end with a bevel-pinion $h$, engaging the gear $g$. By means of these parts described it will be understood that a driving-belt on the step-pulley R will serve to turn the crank-shaft and reciprocate the tool-post H, as stated.

Upon the outer end of the crank-shaft L is secured a bevel-gear S, Figs. 1 and 5, which drives the feed mechanism at the rear of the turret.

T is a bracket, Figs. 11, 13, and 14, secured to the turret, serving to hold the feed-shaft U and counter feed-shaft V, Figs. 13, 16, and 19. A gear W, Figs. 11, 16, and 17, on the shaft U is engaged by the gear S of the crank-shaft, the shaft U being provided with a worm X.

Y, Figs. 1, 10, 11, 12, and 13, is a circular body or base quadrant lying upon the laterally-extended circular part A' of the frame A, held to place by clamping-bolts $l$ in circular grooves $m$ $m$ in the frame, concentric with the center shaft $f$. This quadrant is horizontally adjustable along said grooves, and it is formed near one end with a standard $z$, holding a circular toothed rack $n$ to engage the worm X of the feed-shaft. By means of the worm and said rack when the feed-shaft U is turned one way or the other the arm E will be swung forward or backward, as the case may be, its forward motions being slow and for feeding and its backward motions being quick to clear the cutting-tool from the work.

The gear W is held to turn independent of the shaft U, being rigid with a non-slidable driving clutch ring or member $p$, Fig. 16, held to turn on said shaft, and a coacting slidable clutch member $r$, held to turn on the shaft, serves to be engaged by the member $p$ and be driven by the latter. Near the opposite end of the shaft U is secured rigidly to it a second non-slidable clutch member $s$ in position to be engaged by a coacting clutch member $t$, held to slide longitudinally on but to turn with a sleeve $u$, held to turn on said shaft. A shift-bar $v$, Figs. 1, 10, 11, and 16, held to slide longitudinally in bearings in the bracket T and engaging the said slidable clutch members when moved, serves to shift said members and bring one or the other into engagement with its coacting clutch member. This alternate action of the clutches serves to reverse the direction of the motion of the feed-shaft U—that is to say, when the member $r$ engages with the driving member $p$, as shown in Figs. 1, 11, and 16, the shaft U will turn with the gear W, the clutch $t$ at the opposite end of the shaft being disengaged and idling. When, however, the bar $v$ is shifted to bring the members $t$ and $s$ into engagement, the latter and the shaft U will have their directions of motion reversed, the shaft now turning contrary to the gear W. This matter will be presently more clearly brought out. A gear $w$, Figs. 1, 11, 13, and 15, rigid with the sleeve $u$, is engaged by a pinion $x$, held upon an intermediate stud $y$, projecting from a slotted arm C', held to turn on the counter feed-shaft V. The stud $y$ is laterally adjustable in the slot $z$ of the arm, the latter being controlled by a threaded stud and screw-nut $m^4$, Figs. 14 and 15, playing in a curved slot $n^4$ in the bracket T. Associated with the pinion $x$ is a gear $a'$, both turning together on the stud $y$, the gear being engaged by a pinion $b'$, Figs. 15 and 19, on the counter-shaft V, the pinion $x$ and gear $a'$ being removable to be replaced by others. On the shaft V at its opposite end is secured a gear $c'$, Figs. 11, 17, and 19, engaged by a pinion $d'$, rigid on the sleeve $p$ with the gear W. (See also Fig. 16.)

The sliding clutch member $r$, Figs. 16, 17, 33, and 36, is formed with a longitudinal extension $h'$ in position to engage a pivotal finger $f'$, extending radially out from the axis of the feed-shaft U. This finger is held by an axial pivot-screw $g'$ and occupies a sectoral depression or cavity $o^4$ in the end of the shaft, in which it is adapted to turn one way or the other, as indicated. While the clutch $r$ is disengaged from the clutch $p$, the part $h'$ will normally occupy the position relative to the finger $f'$. (Shown by full lines in Fig. 36.) When, however, said clutches are thrown into engagement, the member $r$ will be turned by the member $p$, as indicated by the associated arrow, and bring the part $h'$ around against the other side of the finger, as shown by dotted lines. The member $r$ continuing its motion, the finger will be carried around with it against the side or shoulder $p^4$ of the cavity $o^4$, when the feed-shaft U will commence to turn with said member $r$. The cavity $o^4$ is purposely made of such size or width that the finger will turn in it just far enough to allow the part $h'$ to reach and reoccupy its original position (shown by full lines and clearly represented in Fig. 36)—that is to say, the construction of the parts is such that the clutch member $r$ and the gear W will turn through just one complete revolution on the feed-shaft U before engaging with and turning the shaft, the latter remaining idle during the time of said revolution of the parts $r$ and W, and as the gear W and the companion gear S, Fig. 1, on the crank-shaft are equal the crank I will make a complete revolution while the feed-shaft is so idling and carry the cutting-tool $o$ through a full stroke forward and back after the clutches $r$ and $p$ are thrown together before the feed-shaft begins to turn to swing the arm E back. The importance of this temporary dwell of the feed-shaft will be understood when it is pointed out that if the arm E were in any case started back by the shaft before the tool had completed the final cut an uneven or rough spot would be left at the base of the tooth where said cut was unfinished; but the arm being temporarily held steadily to place on account of this period of non-action of the feed-shaft gives the crank time in every case in which to move the tool through to the end of the stroke and so complete the final cut, thus insuring smooth surfaces for the teeth.

The arm E is moved back in each case by the feed-shaft while the clutch members $r$ and $p$ are engaged, the shaft then turning with the gear W and at a relatively rapid rate. When the clutches are shifted, as stated, to bring the members $t$ and $s$ into engagement, the feed-shaft is slowly turned in the opposite direction by the driving-pinion $d'$ through the medium of the counter-shaft V and connecting gearing, the member $s$ being the last element in this intermediate gearing acting directly upon feed-shaft. Thus by shifting the clutches the feed-shaft will be turned one way or the other to move the tool-carrying arm E forward or back for the purpose stated.

The clutch member $r$ when disengaged from the member $p$ and idling is turned forward and held to the normal position (shown by full lines in Fig. 36) by means of a slender belt or band $s^3$, Figs. 11, 16, 17, 19, and 33. At its lower end the belt passes around a spool $r^3$, threaded on the end of the shaft V, constituting practically an integral part of the shaft. This belt, controlled by the shaft V, turns the member $r$ around and holds it normally to have the projection $h'$ press the right side of the finger $f'$, as appears in Fig. 36, said finger pressing the shoulder $r^4$ of the cavity $o^4$ in the shaft U as a stop—that is to say, the belt or connector $s^3$ serves to hold the clutch member $r$ normally in such position that when thrown into engagement with the member $p$ it will have to be carried once around on the feed-shaft U before it can engage and turn the latter. After the finger encounters the shoulder or stop $r^4$ the belt slips on its bearings until the clutches are again shifted, the friction of the belt serving to hold the part $h'$ steadily against the finger, as stated.

The gear $c'$, Fig. 19, is designed ordinarily to turn the shaft V, though not made rigid with the shaft, it being held between friction-washers $t^3 u^3$, as of fiber, between which it is pressed by the threaded spool $r^3$, turned against a metal washer $v^3$. This method of holding the gear is to provide against accident and breaking of the gears should anything occur by accident to suddenly stop any of the working parts.

The bar $v$ is moved to shift the clutch members $r$ and $t$ by a vertical lever $i'$, Figs. 10, 11, 13, and 18, held to turn upon a pivot-screw $k'$, rigid in the bracket T, the upper end of said lever being reduced to a tooth $l'$, occupying a notch in the bar, as shown. The lever is provided with a downwardly-projecting stem or part $m'$ to be engaged by either of a pair of adjustable heads or shift-dogs $n'$ $n'$, secured to the base-quadrant Y by clamping-bolts $o'$ $o'$, occupying a circular slot $p'$. (See Fig. 12.) The turning of the turret one way and the other by the worm X brings the stem $m'$ alternately against the dogs $n'$ $n'$, causing the clutches $r$ and $t$ to be shifted and alternately brought into action, as stated. To make the actions of the clutches certain, a spring-actuated V-shaped tooth $r'$, Figs. 13 and 18, is inserted in an axial cavity in the lever $i'$ in position to encounter a similar tooth $s'$, rigid with the bracket T. On account of the inclination of the contact-surfaces of these teeth the tilting of the lever $i'$ will push the tooth $r'$ upward against the spring $t'$, which will in turn force the tooth down the other inclined side of the fixed tooth $s'$ and so complete the swing of the lever and cause the approaching clutch members to fully interlock and not slip. A little cam-lever $u'$, Figs. 10, 13, and 18, pivoted at the upper end of the tooth $r'$, serves when thrown into a horizontal position to draw said tooth upward out of engagement with the fixed tooth $s'$, as sometimes required.

The base-quadrant Y is moved around upon the frame by means of a circular-toothed rack D', Figs. 11 and 13, rigid with the frame, the rack being engaged by a pinion $v'$, held by said quadrant. (See Fig. 12.) The shaft $w'$, carrying said pinion, is formed at its upper end to receive a wrench for turning it. The base-quadrant is formed with vertical ways E', Figs. 1, 11, and 12, holding a vertically-sliding block F', which supports a standard G', carrying at its upper end a changeable form H'. This form, usually having a curved face corresponding with that the faces of the teeth are to receive in any given case, is traversed by a roller $x'$ on a stud $y'$, reaching out horizontally from the end of the arm E as the latter is swung forward and back, as above described. The form-holder G' and form are vertically adjustable by means of a screw $s^4$, Fig. 11, threaded in the part E', and are horizontally adjustable by means of opposing horizontal screws threaded in the standard G', one being shown at $t^4$. These horizontal screws are adapted to press either side of a stud $u^4$, rigid in the sliding block F' and extending out through a horizontal slot $v^4$ in the holder G'.

To aid in supporting the overhanging end of the arm E, a flanged sleeve or pipe I', Figs. 11, 12, and 34, is provided projecting vertically upward through the base-quadrant Y and rigid therewith, which carries the toothed stem or shaft $a^2$ of a vertically-movable horizontal track or shoe K'. The stem $a^2$ is engaged by a toothed weighted lever L', carrying the adjustable weight M', fulcrumed on the pipe I', as shown, the arm E being provided with a roller $z'$ to roll upon the track as said arm swings to and fro, as stated. In some cases the blank B', Fig. 1, to receive teeth is cast solid, as shown, the metal being cut out to form the spaces between the teeth by a primary roughing-tool $o$, (see dotted lines, Fig. 35,) in which case a straight horizontal form H', Fig. 11, is employed. In other cases, as for heavier gearing, the teeth are cast in the blank and need to have only their faces planed to form by right and left side tools, one being shown at $w^4$, Fig. 35, in which case the working face of the form H' is curved, as shown in Fig. 11. In any case the movable counterweight M' on the lever L' serves to balance only a part of the weight of the arm, there being a residue of said weight to hold the roller $x'$ down onto the form.

The turret is formed with an extended circular part $a^5$, Figs. 1 and 11, concentric with the stud F, which is met by a similarly-curved gib $b^5$, rigid with the arm E, to hold the latter to move truly vertical upon said stud while the roller $x'$ moves over the curves of the form H'.

The turret is adapted to move upon the base-quadrant Y when the machine is at work, the quadrant at such times being rigid with the frame; but when the turret and the quadrant are shifted, as in setting the machine for different-sized blank gears, it is desirable that both should move together, to the end that the rollers $x'$ and $z'$ shall remain upon the track K' and the form H', respectively. For this purpose the stand Z of the base-quadrant is formed with an extension $x^4$, Figs. 10, 11, and 12, adapted to temporarily hold a horizontal pin $y^4$ to enter an opposing cavity $z^4$ in the turret, as appears in Fig. 12. When the pin is in place and the quadrant Y is shifted, as stated, the turret and the entire feed mechanism move with the quadrant, the rollers $x'$ and $z'$ maintaining their relative places on the form and the track.

The turret D is provided with a circular gib $b^2$, Figs. 3, 11, 20, and 20½, for holding it to the base C, said gib having an inwardly-projecting circular tongue to occupy the peripheral groove or race $c^2$ of said base and slide therein as the turret is turned. This gib is formed with a T-shaped groove $d^2$, in which to receive a horizontally-adjustable pendent trip-arm N', provided with a rigid trip-point $k^2$. The frame A holds a trip-shaft O', (see also Fig. 1,) extending from end to end thereof, provided with a head $f^2$, Figs. 20 and 27, carrying a loose pendent finger $g^2$ in position to be engaged by the trip-point $k^2$ as the latter passes it when the turret is turned to bring the arm E back, as above described. This passing of the finger by the trip-point slightly lifts the head $f^2$ and serves to temporarily turn the trip-shaft in the frame A, the shaft immediately resuming its normal position after the trip-point clears the finger. The return motion of the turret carries the trip-point again past the finger in the opposite direction; but the shaft is not affected by it, as the finger when pressed yields to the position shown by dotted lines in Fig. 20. These actions of the trip-shaft effect the indexing mechanism at the opposite end of the frame, (shown in Figs. 1, 3, 6, and 21 to 26, inclusive,) as will be presently understood. The blank gear B' to be toothed is held substantially in the usual manner upon a horizontal spindle P' in the head-block B, provided with the usual index-wheel R'. A worm $h^2$, Fig. 23, to engage the wheel R', is held upon a horizontal shaft $i^2$, supported in a bracket S', secured pivotally to the head-block B. A second shaft $l^2$, coaxial with the shaft $i^2$, held by the bracket S', is provided with a belt-pulley T', carrying a driving-belt U', by means of which indirectly the worm $h^2$ is turned and the blank B' indexed. The shaft $l^2$ is provided with a driving-pinion $m^2$ and a frog V', Fig. 24, the frog carrying intermediate reverse-pinions $n^2$ $o^2$ to be alternately engaged as the frog is shifted. The frog is provided with a spring-actuated pawl $c^5$, of common kind, in position to enter rests in an adjacent part $e^5$ of the bracket S', one being shown at $d^5$, Fig. 21, to hold it in either of its two positions. A counter index-shaft $p^2$ is held by the bracket S' parallel with the worm-shaft $i^2$, said counter-shaft being provided with a gear $r^2$, in position to be engaged by either intermediate pinion $n^2$ or $o^2$, as the case may be. At its opposite end the shaft $p^2$ is provided with a gear $s^2$, engaging an intermediate gear $t^2$, Fig. 22, on a stud $u^2$ of an arm W' on the shaft $p^2$, said gear $t^2$ engaging a gear $v^2$ on the worm-shaft $i^2$. By means of this intermediate mechanism the driving-shaft $l^2$ actuates the worm-shaft. The index-bracket S' is adapted to turn pivotally in vertical directions through short distances upon a stud $w^2$, Figs. 6, 21, and 23, rigid in the head-block B, to adjust the worm $h^2$ to the teeth of the index-wheel R'. A loop X', Figs. 1, 6, 22, and 23, is secured to the head-block, having a curved slot $x^2$, occupied by a threaded stud $y^2$, rigid in the bracket S'. The slot $x^2$ is concentric with the pivot-stud $w^2$ of the bracket, and the stud $y^2$ is provided with a clamping-nut $a^3$ at its outer end to secure it, a clamping-bolt $f^5$ serving to rigidly hold the bracket in its various positions of adjustment. The stud $y^2$ rests upon the point of an adjusting-screw $z^2$, reaching upward into the slot $x^2$, by means of which to delicately adjust the bearing between the worm $h^2$ and the index-wheel R'. The driving-belt U' is made loose upon the pulley T' to admit of these adjustments of the bracket S', a tightener Y', Figs. 1, 3, and 6, being provided to maintain a uniformity of tension in the belt.

The belt-pulley T' is yielding and consists of a combination of parts, as appears in Fig. 23. A circular disk $b^3$ is formed with a hub $c^3$ to fit the shaft $j^2$, the pulley proper resting upon said hub, as shown, and free to turn thereon. An opposing disk $d^3$, free to turn upon the shaft, holds between it and the pulley proper a ring $e^3$, of friction material, as leather, (see Fig. 3,) the disk $b^3$ holding a similar friction-ring $f^3$. The lengthened hub of the disk $d^3$ is chambered to receive a spring $g^3$, adapted to be compressed by a thumb-nut $h^3$, threaded upon the end of the shaft $l^2$. By turning the thumb-nut the friction between the pulley and the disks $b^3$ and $d^3$ may be regulated as may be required. The pulley is turned continuously by the belt; but the shaft $l^2$ and the worm $h^2$ turn only at intervals or when the blank gear is indexed for a new tooth. To intermit the action of the worm $h^2$, a stop-bolt or plunger $i^3$, Figs. 23 to 26, is employed, held by a sleeve or barrel $k^3$, rigid in the bracket S'. The outer end of this bolt is adjacent to the gear $r^2$ and in position to engage one or the other of two stop-lugs $l^3 p^3$ on the gear to stop the latter and the index mechanism at intervals, the bolt being held normally in position to engage the gear by a coiled spring $m^3$ in the barrel $k^3$, as shown.

The stop-bolt $i^3$ is operated by the trip-shaft O' by means of a connecting-arm $n^3$, Figs. 3, 6, and 24, on the shaft and forked at its upper end onto the bolt between collars $o^3$ $o^3$. When the trip-shaft is slightly turned by the trip-point $k^2$, as above described, the stop-bolt will be drawn momentarily back from the gear $r^2$, and so start the indexing mechanism to index the blank gear for another tooth. The action of the trip-shaft is but for a moment, the stop-bolt being again given up to the control of the spring $m^3$, which quickly brings it again into position for action; but the coacting lug $l^3$ having escaped the bolt the gear will then make a complete revolution before said lug is again encountered by the bolt and the gear stopped. These lugs are tapered, as clearly shown in Fig. 26, so that in passing the lug $p^3$ is not caught by the bolt to stop the gear, said lug merely gliding past the end of the bolt. For indexing in the opposite direction the frog V' is shifted, as above stated, as a result of which the gear $r^2$ will be immediately turned by the belt one-half around in the opposite direction and bring the lug $p^3$ into engagement with the stop-bolt. These different directions of the motion of indexing are for the purpose of planing the opposite faces of the teeth of the blank. When rough-cutting away the material to form spaces between the teeth of the blank, the latter may be indexed in either direction. The lugs are placed upon the gear relatively and with reference to the thickness of the head of the stop-bolt, so that if the latter engage either, as appears in Fig. 25, just one-half revolution of the gear would bring the bolt similarly against the other, the line of the axis of the bolt in its two relative positions being diametrically across the gear, and these stop-lugs, whichever may be in use, acting with the bolt positively control the motions of the stop-gear, and thus render the indexing movements of the blank gear exactly repetitious.

The gear $s^2$, Fig. 23, of the counter-shaft $p^2$ is seated upon a longitudinally-movable clutch member $g^5$, held to turn upon the shaft. $h^5$ is another clutch member rigid with the shaft in position to engage the member $g^5$, the construction being such that when said clutch members are disengaged the worm-shaft $i^2$ and worm may be turned independently of the shaft $p^2$ and the driving-shaft $l^2$. A thumb-nut $i^5$, threaded on the shaft $p^2$, serves to hold the clutch members $g^5$ and $h^5$ in engagement. Similarly the gear $v^2$ is seated upon a free clutch member $r^5$, adapted to slide along the worm-shaft $i^2$, a companion clutch member $s^5$ being rigid with the shaft. A thumb-nut $t^5$, threaded on said shaft, serves to hold the clutch members in engagement while the machine is operating. When this thumb-nut is loosened, the clutches $r^5$ and $s^5$ may be disengaged and the shaft turned independently of the connecting-gearing. It is essential that both shafts $p^2$ and $i^2$ may be turned independently of the connecting-gearing, so that either the index-wheel R' or the stop-gear $r^2$ may be set or adjusted independently of and without disturbing the other, both shafts having squared terminals, as shown, for receiving a wrench. Ordinarily each index turn of the blank is, in extent, from center to center of adjacent teeth on the pitch-line; but it is sometimes necessary to divide this index unit—as, for example, when changing from a center roughing-tool to a side tool or from one side tool to the other. This will be clearly understood by inspecting Fig. 35. When the roughing-tool $o$ is being used, the blank B' is in such position that the horizontal plane of the cone-center of the machine (represented by the dot-and-dash line $k^5$) will bisect a tooth-space, as shown. When afterward a side tool $w^4$ is put in the machine to form and finish the faces of the teeth on one side, the blank needs to be turned independent of the counter-shaft $p^2$, as above stated, to bring the face of a tooth to coincide with the plane of the cone-center, said plane in this case being represented by the dotted line $m^5$. This turning of the blank gear amounts to one-fourth of the index unit, as will appear from inspecting the figure. Also in changing from one side tool to the other for forming the remaining faces of the teeth the blank must be again turned independent of the counter-shaft to bring the opposite face of a tooth to the plane of the cone-center. (Represented in this position of the blank by the dotted line $n^5$.) This turning of the blank is through one-half of the index unit, as will plainly appear. These movements of the blank gear through fractions of the index unit are effected by disengaging the clutch members $g^5$ and $h^5$, as above stated, and turning the gear $s^2$ independent of the counter-shaft $p^2$.

The tool-post H, Figs. 3 and 29 to 31, is vertically adjustable upon a slide-block $w^3$ by means of a hand-screw $x^3$, said block occupying a dovetail recess in the post. The slide-block is fitted to the face of the slide G in the arm E and secured by clamping-bolts $y^3$. The tool-post comprises a swivel-holder Z', Figs. 1, 3, 29, 31, and 32, held to turn through short distances in the body of the post on a horizontal stem or bearing $z^3$, a clamping-stud $a^4$ of said holder, occupying a curved slot $b^4$, Fig. 30, in the tool-post, serving to aid in retaining the swivel-holder in its various positions of adjustment. A bolt $c^4$, passing vertically through said holder and threaded in the body of the tool-post, also serves to more rigidly fix said holder, the opening through the latter occupied by the bolt being oppositely tapered, as indicated by inclined dotted lines in Fig 29, to permit of said motions of the swivel-holder. This swivel-holder holds between its jaws a prismatic tool-holding box $d^4$ for receiving and directly holding the operating-tools $o$ and $w^4$, ordinary set-screws $e^4$ $e^4$ being employed to press said tools. The part $d^4$ is adapted to turn slightly in horizontal directions in the swivel-holder Z' on a tapered pin $f^4$ to permit the tool to clear the work during its backward movements along the arm E. The box $d^4$ is provided with a return-arm $h^4$, Figs. 1, 29, and 30, in position to encounter a return block or bluffer $i^4$, held adjustably in a longitudinal groove $k^4$ in the arm E, to return the tool to its normal position ready for another cut. The swivel motions of the holding-box and the tool are represented by full and dotted lines in Fig. 32.

The head-block B, with the entire indexing mechanism, is arranged to be shifted longitudinally upon the frame A by means of a horizontal adjusting-screw $A^2$, Figs. 3 and 6, held by the frame. When the head-block is thus shifted, the arm $n^3$ for actuating the stop-bolt $i^3$ slides along the trip-shaft O', a key or spline rigid in said arm traversing a longitudinal keyway in the trip-shaft as the arm passes along.

The pivot-stud F for the tool-carrying arm E, Figs. 1, 3, 7, and 11, is formed with an axial opening $p^5$ to receive a center-pin $o^5$, tapered at its point, as shown. The point of this pin when in place in the stud coincides with the cone-center of the machine, being at the common point where the axes of the spindle P', the vertical shaft $f$, and the axial stud F intersect. This center-pin is at times useful in constructing and using the machine.

What we claim as our invention is—

1. A machine for planing gears, having a turret and a tool-carrying arm held by the turret, in combination with a feed-shaft held by the turret and adapted to move therewith, a worm on the feed-shaft, a toothed segment independent of the turret to engage the worm, and means to rotate the feed-shaft alternately in opposite directions, and at different rates of speed, whereby the tool-carrying arm is swung slowly forward and rapidly back, substantially as shown and described.

2. A gear-planer having a frame, a revolving turret supported by the frame, a tool-carrying arm held by the turret, a toothed segment supported by the frame, a feed-shaft on the turret, a worm on the feed-shaft to engage the toothed segment, the turret being adapted to move either with or independent of the segment, and means for revolving the feed-shaft alternately in opposite directions and for shifting the segment, substantially as shown and described.

3. A gear-planer having feed mechanism comprising a shaft and worm thereon, a slidable and a coacting non-slidable clutch member at either end of the shaft, one slidable clutch member being adapted to turn the shaft, gearing connecting said non-slidable member at one end of the shaft with the slidable member at the other end of the shaft, a toothed segment to engage said worm, and means to shift said slidable clutch member and to rotate said gearing, substantially as shown and described.

4. A gear-planer having feed mechanism comprising a feed-shaft and a parallel counter-shaft adapted to turn in the same or in opposite directions, a worm on the feed-shaft, a slidable and a coacting non-slidable clutch member at either end of the feed-shaft, one slidable member being adapted to turn the shaft, a train of gears connecting the slidable member at one end of the feed-shaft with said counter-shaft, gears connecting the non-slidable member at the opposite end of the feed-shaft with the counter-shaft, a fixed toothed segment to engage said worm, and means to shift said slidable clutch members and to rotate the gears and the counter-shaft whereby the feed-shaft may have its directions of motion reversed, substantially as and for the purpose set forth.

5. In a device for planing gear-teeth, feed mechanism comprising a feed-shaft and a parallel counter-shaft, a worm on the feed-shaft, a slidable and a coacting non-slidable clutch member at either end of the feed-shaft, one slidable member being adapted to turn the shaft, a series of alternated changeable gears connecting the slidable member at one end of the feed-shaft with the counter-shaft, gears connecting the counter-shaft with the non-slidable member at the opposite end of the feed-shaft, a toothed segment to engage said worm, and means for shifting the slidable clutch members, and to rotate the gears and the counter-shaft, substantially as shown and described.

6. A device for planing the teeth of gears, having a frame, and feed mechanism movable as a unit, comprising a shaft and worm thereon, a shiftable and a coacting non-shiftable clutch member at either end of the shaft, one shiftable member being adapted to turn the shaft, gearing connecting said non-shiftable member at one end of the shaft with the shiftable member at the other end of the shaft, a quadrant or body secured to the frame, holding a toothed segment for engaging said worm, a bar to control said shiftable clutch members, a lever to engage the bar, and shifters for the lever secured to the quadrant, with means to rotate said gearing, substantially as shown and described.

7. A gear-planer having feed mechanism comprising a feed-shaft and a parallel counter-shaft, a worm on the feed-shaft, a slidable and a coacting non-slidable clutch member at either end of the feed-shaft, the slidable member at one end of the shaft being adapted to both turn upon the shaft and to control or drive the latter, gearing connecting the slidable member at one end of the feed-shaft with the counter-shaft, gears connecting the non-slidable member at the opposite end of the feed-shaft with the counter-shaft, a toothed segment to engage the worm, and means for shifting the slidable clutch members and to turn the gears, substantially as shown and described.

8. A gear-planer having feed mechanism comprising a feed-shaft, a driving clutch member free to turn on the feed-shaft, a coacting driven clutch member adapted to slide on the feed-shaft and to turn thereon, and to turn the feed-shaft at intervals, with means for turning said driving clutch member, substantially as shown and described.

9. A gear-planer having feed mechanism comprising a feed-shaft, a driving clutch member free to turn on the feed-shaft, a coacting driven clutch member adapted to turn without effective action through a prearranged distance on the feed-shaft, and to engage with and drive the latter, and means for turning said driving clutch member, substantially as shown and described.

10. A gear-planer having feed mechanism comprising a feed-shaft, a driving clutch member free to turn on the feed-shaft, a coacting driven clutch member adapted to turn idly through a prearranged distance or period on the feed-shaft and to engage with and drive the latter, with means for holding said driven clutch member at the beginning of said period of inaction, whereby the feed-shaft may temporarily remain at rest, with means for turning said driving clutch member, substantially as and for the purpose specified.

11. A gear-planer having feed mechanism comprising a feed-shaft, a driving clutch member adapted to turn on the feed-shaft, a coacting driven clutch member adapted to turn on the feed-shaft, a finger projecting from the feed-shaft to be engaged by said driven clutch member whereby the feed-shaft is turned, and means for turning said driven clutch member, substantially as shown and described.

12. A gear-planer having feed mechanism comprising a feed-shaft, a driving clutch member adapted to turn on the feed-shaft, a coacting driven clutch member adapted to turn on the feed-shaft, a pivotal finger projecting radially from the axis of the feed-shaft and adapted to turn between stops, in position to be engaged by said driven clutch member, and means for operating said driving clutch member, substantially as shown and described.

13. A gear-planer having feed mechanism comprising a feed-shaft, a driving clutch member adapted to turn on the feed-shaft, a coacting driven clutch member adapted to turn on the feed-shaft, and formed with a longitudinal extension, a pivotal finger projecting from the feed-shaft in position to be engaged on either side by said extension of the driven clutch member as the latter is turned one way or the other, said finger being adapted to turn laterally between stops or limits to permit the driven clutch member to be turned one way or the other upon the shaft through a single complete revolution, with means for turning said driving clutch member and the driven clutch member, substantially as shown and described.

14. A gear-planer comprising a crank-shaft and a feed-shaft connected by engaging gears, a driving clutch member rigid with the gear on the feed-shaft and free to turn on the latter, a driven clutch member adapted to turn on the feed-shaft and be engaged by the driving clutch member and to engage the feed-shaft at intervals, said driven clutch member being adapted to turn on the feed-shaft while the crank-shaft makes a revolution, and to engage and turn the feed-shaft, and means for turning the crank-shaft, substantially as and for the purpose specified.

15. A gear-planer having feed mechanism comprising a feed-shaft and a coacting counter-shaft and gears connecting said shafts, a worm on the feed-shaft and a toothed segment to engage the worm, a driving clutch member adapted to turn on the feed-shaft, a coacting driven clutch member adapted to turn on the feed-shaft and to engage with and turn the latter, a connector for the driven clutch member and the counter-shaft, and means for turning said driving clutch member, substantially as shown and described.

16. A gear-planer having feed mechanism comprising a feed-shaft and a coacting counter-shaft and gears connecting said shafts, a worm on the feed-shaft and a toothed segment to engage the worm, a driving clutch member and a coacting driven clutch member both adapted to turn on the feed-shaft, said driven member being adapted to engage with and turn the feed-shaft, a connector for the counter-shaft and the driven clutch member, acting to turn the latter in a direction contrary to that in which the driving clutch member turns it, and means for turning the driving clutch member, substantially as shown and described.

17. A gear-planer having feed mechanism comprising a feed-shaft and a coacting counter-shaft, and engaging gears on the respective shafts, a worm on the feed-shaft, and a toothed segment to engage the worm, the gear on the counter-shaft being held by a yielding pressure whereby it may turn on the shaft, and means for turning said shafts and connecting-gears, substantially as and for the purpose specified.

18. A gear-planer comprising a crank-shaft and gear thereon, a feed-shaft, a driving clutch member adapted to turn on the feed-shaft, a coacting driven clutch member on the feed-shaft and adapted to turn the latter, a counter-shaft provided with a gear, gears rigid with said driving clutch member to engage respectively said gear on the counter-shaft and said gear on the crank-shaft, and means for turning the latter, substantially as shown and described.

19. A gear-planer having a frame, a pivotal tool-carrying arm supported by the frame, a body or quadrant upon the frame, provided with a form movable in ways in said quadrant, the tool-carrying arm having an extended part, a roller carried by a stud extending horizontally from said extended part to bear upon said form, a roller on the under side of said arm, a yielding track or platform for the roller supported by said quadrant, and means for moving the tool-carrying arm alternately forward and back, substantially as shown and described.

20. A gear-planer having a frame, a pivotal tool-carrying arm supported by the frame, a body or quadrant upon the frame, provided with a form, the tool-carrying arm having an extended part to bear upon said form, a roller on said arm, a sleeve projecting vertically through the quadrant, a platform supported by said sleeve and adapted to move vertically, a weighted lever engaging the toothed stem of said platform to control said platform, and means for giving the tool-carrying arm horizontal motions, substantially as shown and set forth.

21. A gear-planer having a head-block, a bracket held pivotally to the head-block, and a wheel carried by the head-block, a worm-shaft with worm to engage said wheel, a slotted loop or rest on the head-block, and a stud on the bracket occupying the loop, and an adjusting-screw threaded in the loop to engage said stud, with means for actuating the worm-shaft, substantially as shown and set forth.

22. A gear-planer comprising a worm-wheel, a worm-shaft and worm thereon to engage the wheel, a counter-shaft and gearing connecting it with the worm-shaft, a stop-gear on the counter-shaft, provided with projecting lugs on opposite sides of the counter-shaft, facing each other, a stop-bolt adapted to engage either of said lugs, the space between the working faces of the lugs traversed by the stop-bolt being half a circle in extent plus the thickness of the coacting part of the stop-bolt, and means for turning the counter-shaft, substantially as and for the purpose specified.

23. A gear-planer having a worm-wheel, a worm-shaft and worm thereon to engage the wheel, a counter-shaft, a stop-gear on the counter-shaft provided with opposing projections, a stop-bolt adapted to engage said projections, a clutch member rigid with the counter-shaft, a companion clutch member loose on the counter-shaft, a gear on said loose clutch member connected by gearing with the worm-shaft, with means for turning said counter-shaft, substantially as set forth.

24. A gear-planer having a worm index-wheel, a worm-shaft and worm thereon to engage said wheel, a counter-shaft, a stop-gear on the counter-shaft and means to control it, a clutch member rigid with said worm-shaft, a clutch member rigid with the counter-shaft, a loose companion clutch member for each of said rigid clutch members, a gear forming part of a train on each of said loose clutch members, and an intermediate gear in said train, substantially as and for the purpose specified.

25. In a gear-planer a tool-post having a swivel-holder adapted to turn on a horizontal axis in said post, a tool-carrying box held by said swivel-holder, and having pivotal motion therein on a vertical axis, and means for turning said tool-carrying box, substantially as shown and described.

26. A gear-planer having a head-block, a bracket held pivotally to the head-block, and a wheel carried by the head-block, a worm-shaft with worm, and a driving-shaft on the bracket, and gearing connecting the driving-shaft and the worm-shaft, a belt-pulley on the driving-shaft, a belt on the pulley, and means for controlling the tension of the belt, substantially as and for the purpose set forth.

27. A gear-planer having indexing mechanism comprising a worm-wheel, and a worm-shaft having a worm to engage said wheel, a driving-shaft, a counter index-shaft, and a series of gears connecting said counter-shaft with the worm-shaft, a stop-gear on the counter-shaft, and reversible gearing for connecting the driving-shaft with said stop-gear, a stop-bolt or plunger for controlling the stop-gear, and means for actuating the stop-bolt or plunger, and for giving the driving-shaft a yielding motion, substantially as and for the purpose specified.

28. A gear-planer having indexing mechanism comprising a worm-wheel, and a worm-shaft having a worm to engage said wheel, a driving-shaft, a counter index-shaft, and a series of gears connecting said counter-shaft with the worm-shaft, and other gears for connecting the counter-shaft and the driving-shaft, whereby the worm is rotated, and means for turning the worm through short distances independent of the counter-shaft and for actuating the driving-shaft, substantially as and for the purpose specified.

29. A gear-planer having a frame, a turret and a head-block on the frame, a worm-wheel carried by the head-block, a worm-shaft and worm thereon to engage the wheel, a driving-shaft and a counter-shaft, gearing connecting said counter-shaft with the worm-shaft, a stop-gear on the counter-shaft, and gearing connecting the driving-shaft with said stop-gear, a stop-bolt for the stop-gear, a trip-shaft, a member connecting the trip-shaft with the stop-bolt, and a trip-arm carried by the turret to actuate the trip-shaft, substantially as set forth.

In witness whereof we have hereunto set our hands, this 11th day of December, 1900, in the presence of two subscribing witnesses.

WILLIAM GLEASON.
JAMES E. GLEASON.

Witnesses:
ENOS B. WHITMORE,
M. B. SMITH.